Patented Apr. 6, 1948

2,439,051

UNITED STATES PATENT OFFICE 2,439,051

FLEXIBLE SHEET MATERIAL COMPRISING A SURFACE COATING CONTAINING POLYVINYL CHLORIDES

John Heron McGill, Manchester, England, assignor to Imperial Chemical Industries Limited, a corporation of Great Britain No Drawing. Application October 28, 1942, Serial No. 463,692. In Great Britain October 8, 1941

Section 1, Public Law 690, August 8, 1946
Patent expires October 8, 1961

4 Claims. (Cl. 117—72)

The present invention relates to the provision of an improved flexible sheet material of the kind made from a plasticised and gelatinised polyvinyl chloride composition, and more particularly to the improvement of the surface characteristics of sheet material comprising a sheet or surface coating of a plastic composition based on gelatinised polyvinyl chloride, super-chlorinated polyvinyl chloride, or interpolymers of vinyl chloride with acrylic acid esters, methacrylic acid esters or vinyl esters. These products are all referred to hereinafter as polyvinyl chlorides.

In the manufacture of flexible sheet material from gelatinised polyvinyl chloride compositions, whether or not backed by a textile, paper or other substrate, the polyvinyl chloride must be gelatinised by means of a substantial proportion of a plasticizer in order to make it sufficiently pliable to withstand repeated flexion. It has hitherto been a disadvantage of this type of sheet material that when the polyvinyl chloride has been gelatinised with an adequate proportion of plasticiser it exhibits a certain degree of stickiness. This is a highly undesirable quality for materials to be used for decorative and protective purposes, for instance leather substitutes, waterproof fabrics and the like, for which the mechanical properties of sheets and coatings made from polyvinyl chloride would otherwise render them particularly suitable. This stickiness is in some cases evident even at ordinary temperatures, whilst in other cases it may only appear when the sheet material is warm.

Attempts to eliminate this defect by proper control of the proportion of plasticiser and other ingredients, for instance, fillers and pigments, in relation to the proportion of polyvinyl chloride in the composition have not met with much success since compensatory disadvantages are experienced in practice. Attempts have also been made to remove the surface stickiness of sheet materials based on gelatinised polyvinyl chloride by the application of various types of surface lacquers, but hitherto without leading to any useful results.

I have found that if there is applied to the surface of the sheet material a lacquer comprising a dispersion of a polyvinyl chloride powder in a solution of hard, resinous, transparent, polymerised unsaturated compound with which polyvinyl chloride is compatible dissolved in a volatile solvent in which the polyvinyl chloride is insoluble and the solvent is evaporated, the surface stickiness is eliminated and an attractive eggshell or dull surface appearance is obtained. This is a most surprising result since the hard, resinous transparent, polymerised unsaturated compound which is used with the polyvinyl chloride according to my invention becomes sticky if the dispersed polyvinyl chloride is omitted from the lacquer. The egg-shell or dull surface coating obtained according to the method of my invention, moreover, is superior to those obtained when the ordinary pigments or the like insoluble in the lacquer are employed to reduce the lustre of the hard, resinous, transparent, polymerised unsaturated compound, since it withstands flexion without leaving a permanent pale trace along the line of flexion.

The invention consists in part of a process for the surface coating of sheet material comprising gelatinised polyvinyl chloride, according to which a dispersion of polyvinyl-chloride powder in a solution of a hard, resinous, transparent, polymerised unsaturated compound other than polyvinyl chloride with which polyvinyl chloride is compatible in a volatile solvent in which the polyvinyl chloride is insoluble is applied to the gelatinised polyvinyl chloride surface, and the volatile solvent is evaporated.

The invention also consists in a lacquer comprising the aforesaid dispersion.

The invention further comprises a sheet material having a coating of gelatinised polyvinyl chloride and a superimposed surface coating comprising ungelatinised polyvinyl chloride powder dispersed in a hard, resinous, transparent, polymerised unsaturated compound other than polyvinyl chloride with which the polyvinyl chloride is compatible.

In putting the invention into effect, it will be understood that the evaporation of the solvent is conducted at a temperature below that at which the polyvinyl chloride commences to gelatinise. The dispersion of the polyvinyl chloride may advantageously be made with the assistance of a colloid mill or other apparatus of the kind ordinarily used for the manufacture of dispersions, and the solution of the hard, resinous, transparent, polymerised unsaturated compound other than polyvinyl chloride is advantageously employed at ordinary temperature in making up the dispersion.

Polyvinyl chlorides are insoluble in a large number of common volatile organic solvents capable of dissolving hard, resinous, transparent, polymerised unsaturated compounds with which the polyvinyl chlorides are compatible, and accordingly a large number of common volatile organic solvents are available for use according to the present invention, for instance, benzene, toluene, xylene, ethyl acetate, butyl acetate, ethyl lactate, acetone, methyl ethyl ketone, 1:4 dioxane, methyl alcohol, methoxy-ethyl alcohol, ethoxy-ethyl acetate, chloroform, methylene chloride and trichlorethylene, and mixtures containing two or more of these solvents. Certain of these volatile solvents although incapable of dissolving polyvinyl chlorides have a certain swelling action upon them, but this is not disadvantageous for the purposes of the present invention.

As hard, resinous, transparent, polymerised, unsaturated compounds there may be used, for instance, polymethacrylic esters of saturated aliphatic alcohols containing 1 to 3 carbon atoms, polyvinyl esters of lower fatty acids, polyvinyl acetals, polymerised acrylic esters and methacrylic nitrile. In addition to the above various alkyd resins such as glycerol phthalate and glycerol succinate, and many other synthetic resinous materials may be used.

The invention is illustrated by the following examples, in which the parts are parts by weight, except where otherwise stated.

*Example 1*

A leathercloth prepared by calendering a plastic composition made from polyvinyl chloride, tricresyl phosphate and yellow ochre on to a textile fabric base is coated by spreading it by means of a doctor with a lacquer made by mechanically dispersing 10 parts polyvinyl chloride powder screened to pass a 150 mesh British standard specification sieve in 100 parts of a 10 per cent. solution of polymethyl methacrylate in a solvent consisting of a mixture of benzene and industrial alcohol in the ratio 4:1 by volume. Two coats of this lacquer are applied, the first being dried off before the application of the second. The resulting dull finish leather-cloth has an attractive appearance, and is of superior quality.

*Example 2*

The polyvinyl chloride leathercloth used is as in Example 1, and the lacquer is applied in similar fashion, but contains only 10 parts polyvinyl chloride dispersed in 300 parts of the 10 per cent. polymethyl methacrylate solution. The resulting product has an attractive egg-shell finish.

*Example 3*

To a leathercloth made by calendering a plastic containing polyvinyl chloride, tricresyl phosphate and Prussian blue to a textile fabric base there is applied by means of a spray gun a lacquer similar to that described in Example 1 thinned to spraying consistency with a mixture containing benzene and alcohol in the ratio 80:20 by volume.

*Example 4*

Equal weights of polyvinyl chloride powder screened so as to pass a 150 mesh British standard specification sieve and polymethyl methacrylate are worked together in a Werner Pfleiderer incorporating machine with a volatile solvent consisting of a mixture of benzene and industrial alcohol in the ratio 80:20 by volume until the polymethyl methacrylate has dissolved. The mixture is then thinned with the same volatile solvent mixture until it contains 18 per cent. solids. The resulting lacquer is applied as described in Example 1 to a leathercloth made by spreading a paste containing polyvinyl chloride, chrome yellow and dibutyl phthalate to a textile base and heating the coated fabric sufficiently to gelatinise the polyvinyl chloride.

The dull finish obtained according to the invention retains its dull or egg-shell appearance in service at temperatures up to or exceeding 60° C., and is desirably resistant to weathering.

The dispersions used according to the present invention for application to the polyvinyl chloride sheet material differ from the so-called polyvinyl chloride pastes made with polyvinyl chloride and a plasticiser, since they show little deterioration in their fluidity on long storage, even at temperatures quite substantially above atmospheric, e. g. 40° C. It will be understood, however, that it is preferable to avoid the use of high temperatures when making them up, and to store and use them at ordinary temperatures or even reduced temperatures. In the foregoing examples, the lacquer is for instance applied to the polyvinyl chloride coated textile at room temperature.

I claim:

1. A process for the surface coating of sheet material having a layer of a composition containing polyvinyl chloride and a plasticizer, which comprises dispersing polyvinyl chloride powder in a solution of a polymethacrylic ester of a saturated aliphatic alcohol containing 1 to 3 carbon atoms, the solvent of the said solution being volatile and one in which the polyvinyl chloride is insoluble, applying the said solution to the plasticized polyvinyl surface and thereafter evaporating the volatile solvent.

2. A sheet material having a layer of a composition containing polyvinyl chloride and a plasticizer and a superimposed surface coating comprising unplasticized polyvinyl chloride powder dispersed in a polymethacrylic ester of a saturated aliphatic alcohol containing 1 to 3 carbon atoms.

3. A process of preparing coated fabrics which comprises calendering onto a fabric base a plastic composition, the film-forming agent of which consists of polyvinyl chloride, and applying thereto a composition containing a solution of material selected from the group consisting of polymeric esters of methacrylic acid and a lower saturated aliphatic alcohol containing 1 to 3 carbon atoms, polyvinyl esters of lower fatty acids, polyvinyl acetals, polymeric esters of acrylic acid, and polymeric methacrylic nitrile, said solution having dispersed therein finely divided solid polyvinyl chloride powder.

4. An artificial leather comprising a fabric base having a calendered layer of a plastic composition consisting essentially of polyvinyl chloride and a solvent plasticizer therefor, and a surface layer comprising a hard, resinous, transparent, polymerized, unsaturated compound selected from the group consisting of polymeric esters of methacrylic acid and a lower saturated aliphatic alcohol containing 1 to 3 carbon atoms, polyvinyl esters of lower fatty acids, polyvinyl acetals, polymeric esters of acrylic acid, and polymeric methacrylic nitrile, said surface layer having dispersed therein finely divided solid polyvinyl chloride powder.

JOHN HERON McGILL.

REFERENCES CITED

The following references are of record in the file of this patent:

UNITED STATES PATENTS

| Number | Name | Date |
|---|---|---|
| 1,436,820 | Plauson | Nov. 28, 1922 |
| 2,113,767 | Paggi | Apr. 12, 1938 |
| 2,227,163 | Starck | Dec. 31, 1940 |
| 2,254,072 | Jenkins | Aug. 26, 1941 |